R. HUFF.
GEAR CONTROLLING MECHANISM FOR MOTOR VEHICLES.
APPLICATION FILED MAY 6, 1909.
1,157,693.
Patented Oct. 26, 1915.
2 SHEETS—SHEET 1.
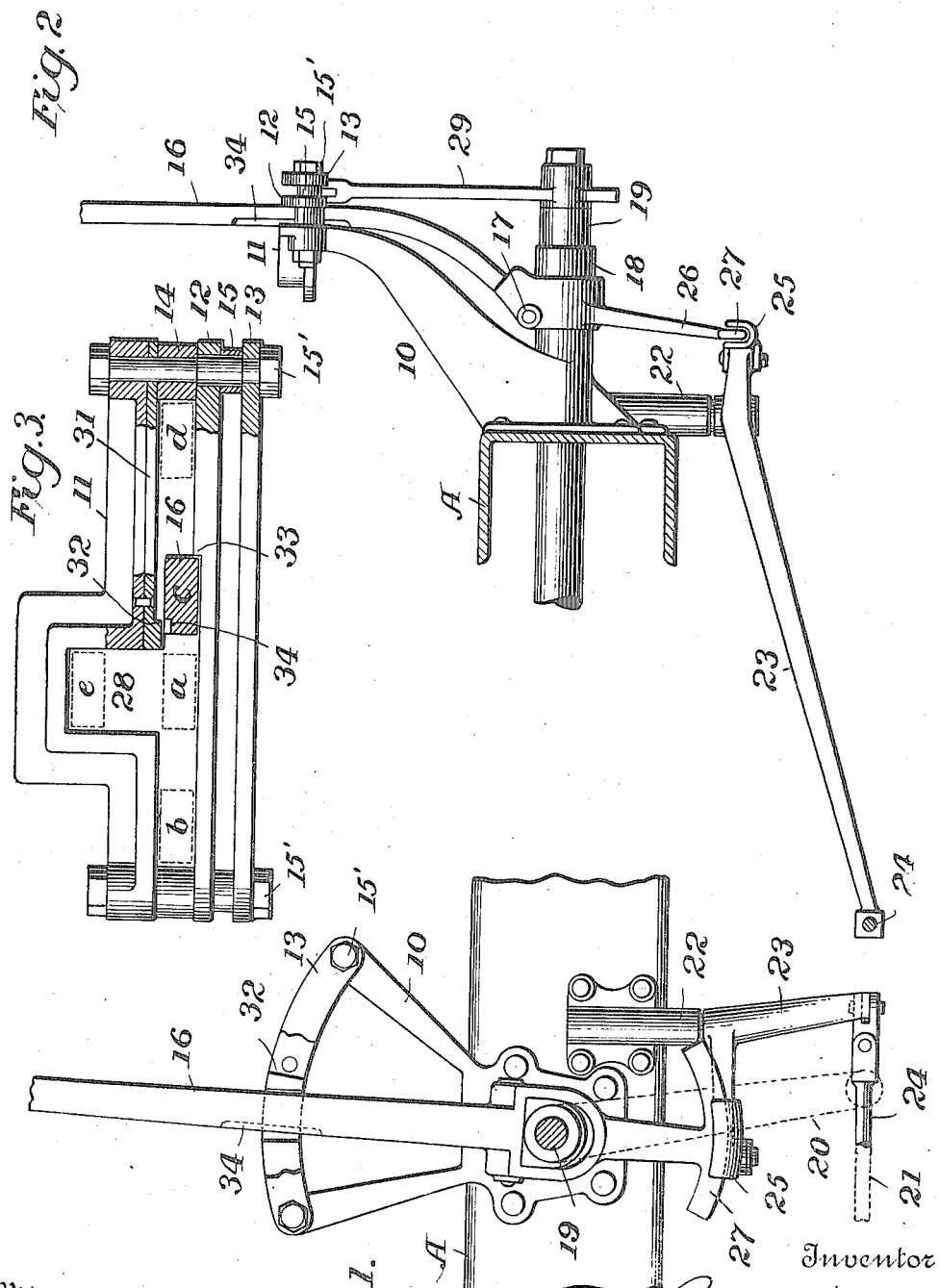
Witnesses
Inventor
Russell Huff
By Foster Freeman Watson Coit
Attorneys R. HUFF.
GEAR CONTROLLING MECHANISM FOR MOTOR VEHICLES.
APPLICATION FILED MAY 6, 1909.
1,157,693.
Patented Oct. 26, 1915.
2 SHEETS—SHEET 2.
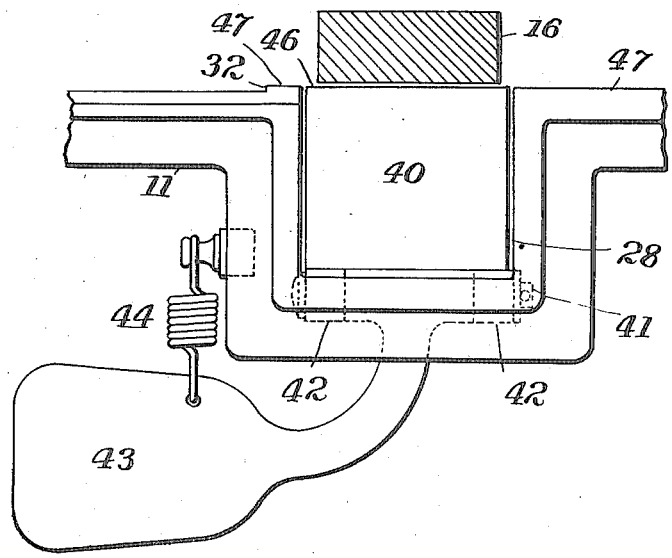
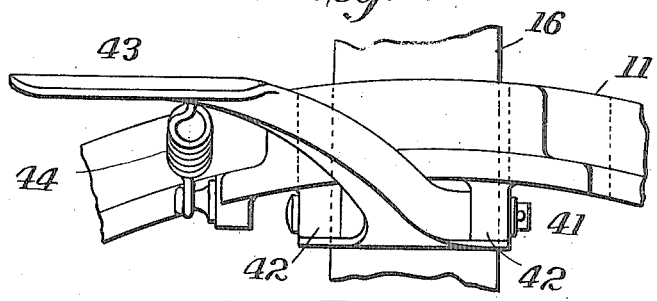
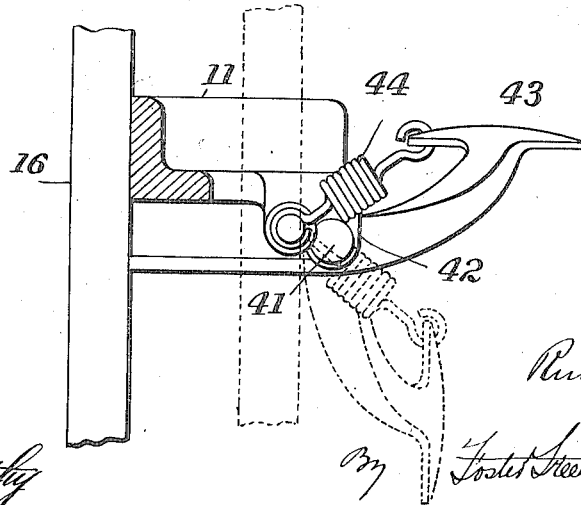

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

GEAR-CONTROLLING MECHANISM FOR MOTOR-VEHICLES.

1,157,693.     Specification of Letters Patent.     Patented Oct. 26, 1915.

Application filed May 6, 1909. Serial No. 494,457.

*To all whom it may concern:*

Be it known that I, RUSSELL HUFF, a citizen of the United States, and resident of Detroit, in the county of Wayne and State of Michigan, have invented certain new and useful Improvements in Gear-Controlling Mechanism for Motor-Vehicles, of which the following is a specification.

This invention relates to controlling mechanism for motor vehicles, and more particularly to the progressive or semi-selective type of gear control mechanism as distinguished from the full-selective type, which latter has a single neutral position from which the single shifting lever may be moved to any of the forward or reverse gear positions without passing through any other gear position. In the present mechanism there is a neutral position from which the single shifting lever may be moved forward, rearward, and transversely to one side, to obtain two forward speeds and a reverse respectively, and to obtain a speed ratio higher than that secured by the position forward of the neutral position it is necessary to move the shifting lever another step forwardly passing through what might be termed a quasi-neutral position; that is, the intermediate speed gears pass out of mesh just before the higher gears go into mesh, but the gears are so closely associated that it is not safe to hold the gear shifting lever in this quasi-neutral position as a very slight movement will cause one of the two sets of gears to clash. It will be understood that the various gears are retained in their correct positions by spring-pressed dogs engaging in notches or recesses in the gear shifter rod by which means the operator can feel when the gears are in full mesh. But in making a quick change of gear, particularly in shifting from high to the next lower or intermediate gear ratio the operator may unintentionally pass through the intermediate gear and get into neutral since the controlling lever is moving so rapidly that it is not stopped by the spring-pressed dogs above referred to, and full control of the vehicle is thereby lost. The same result is liable to occur in shifting from neutral to the next higher or intermediate gear although this is not so liable to happen, as this shift does not as a rule require to be made so quickly as when stepping down from high to second. It is not always desirable, however to stop in the intermediate gear in stepping down from high to low or reverse, and a mechanism is preferable which will permit the operator to move the lever from high gear position through the intermediate gear and to neutral position by a single continuous movement.

As the gear control mechanism is always arranged at one side of the operator's seat, the natural tendency of the operator in moving the control lever toward the rear longitudinally of the vehicle is to pull it toward him or inwardly against the guide bracket or sector and when he pushes the lever forwardly the tendency is to push it away from him or outwardly from the vehicle against the outer guide of the bracket or sector. This invention depends in part for its most successful operation on this tendency and provides means for insuring that the lever shall stop in intermediate position unless the operator by intention opposes the natural tendency above referred to.

The invention consists in providing the guide or sector with stop shoulders located on opposite sides of the lever engaging faces of the bracket. These shoulders face in opposide directions. The shoulder which stops the lever when it is moved from high to intermediate position, faces the high speed end of the guide, and the shoulder which stops the lever when it is moved from low to intermediate, faces the direction of the neutral end of the guide. These shoulders are shallow so that the movement of the lever transversely of the slot will not be great enough to engage the reverse gear, and furthermore by this shallow construction an approximately continuous and direct passage is formed from high to low, or neutral, if the operator wants to shift from high to neutral. In the use of a speed controlling lever and guide of this construction in which the lever moves back and forth for changes in forward speeds, and into a recess in one of the side members for reverse, there is danger that the lever may be inadvertently moved to reverse position. This invention therefore provides means for preventing such inadvertent movement. Upon the side member and within the recess is pivotally mounted a gate which when thrown to operative position bridges the recess to connect the opposite sides of the same and form a continuous bearing surface with the guide. This gate is adapted to be retained in both operative and inoperative positions by means of a spring.

In the drawings: Figure 1 is a view of the operating lever and bracket looking toward the side of the frame; Fig. 2 is an end view; Fig. 3 is a plan view partly in section; Fig. 4 is a detail plan view of the guide showing the bridging device; Fig. 5 is a side elevation; Fig. 6 is an end elevation partly in section.

Referring to the drawings, A designates the side bar of the frame of the vehicle. To this side bar is bolted or riveted a sector bracket 10 integral with which is one side 11 of the sector. A division bar 12, and a second bar 13, separated by collars 15 and by collars 14 from the side bracket, are secured together by bolts 15' thereby forming guides for the operating lever and for the brake lever.

The operating lever 16 is pivoted at 17 upon a collar 18 secured to an operating shaft 19 which runs across the frame of the machine. To this operating shaft 19 is secured an arm 20, to which is connected the operating bar 21 which actuates the change speed gears. Upon a bracket 22, secured to the side bar A, is pivoted a double-arm lever 23, to one arm of which is connected, by means of a universal joint, the operating bar 24 which actuates and throws the reverse gear into operative position. To the other arm is pivotally connected a slide-way 25. The operating lever 16 is extended downwardly below its pivot, forming an arm 26 provided with a segment 27 which slides in the slide-way 25. The side member 11 is provided with a recess 28 in which the operating lever 16 may be moved. Brake lever 29 is loosely pivoted on shaft 19.

The operating lever is shown in five positions in Fig. 3. *a* is the neutral position; *b* the low speed; *c* the intermediate; *d* the high speed, and *e* the reverse. There is, of course, between positions *c* and *d* a quasi-neutral position, but this is not a position in which the lever can be stopped as there is no spring dog provided to hold the gears. When the operating lever is moved to the positions *a*, *b*, *c*, *d*, it operates through the arm 20 and operating bar 21, to shift the change speed gears to the different positions, the movement of the lever being a back-and-forth movement. In order to throw the gears to reverse position, the operating lever is moved inwardly from the position *a* to the position *e*. In this operation the lever 16 swings about pivot 17 and through arm 26, segment 27, slide 25, lever 23, and bar 24, actuates the mechanism for throwing the gears to reverse position. During this movement the arm 20 and bar 21 are not moved, while during the back-and-forth movement of the operating lever 16, the segment 27 slides in the slide-way 25 without actuating the reverse mechanism.

The side member 11 has riveted or bolted to it a steel plate 31 which is provided with a shallow stop or shoulder 32. The bar 12 also is provided with a cut-out portion forming a shallow shoulder 33, which faces oppositely from 32. The shoulder 32 stops the operating lever 16 when it is moved from high speed to intermediate position, while the shoulder 33 stops the lever in intermediate position when it is moved either from neutral or from low speed position. There are thus provided a series of stops which will insure that lever 16 will be stopped in intermediate position. Lever 16, as shown in the drawing, is provided with a cut-out portion 34 which forms a shoulder coöperating with the stop 32. The purpose of this cut-out portion is to adapt larger size levers to a standard form of operating lever bracket. The operating lever bracket is generally made of bronze or some other comparatively soft metal and therefore the plate 31 is made of steel so that the shoulder 32 will not be sheared off. It is not necessary to provide the bar 12 with a steel facing for the reason that the shoulder 33 on that bar has a large bearing.

It will be noted that the shoulder 32 is on that side of the slot which is toward the operator. Therefore when the lever is moved backwardly toward the operator, from high speed to intermediate position, the natural tendency is to bear the lever against the steel plate 31, and bring the lever up against the shoulder 32. Similarly when the lever is moved from low speed or neutral to intermediate position, that is forwardly, the natural tendency is to move the lever against the bar 12 and bring it up against the stop 33. It will be seen that the stops 32 and 33 can be very shallow on account of the pressure against the sides of the slot when the lever is operated. This is an important feature of this invention as thereby the slot formed by the members 11 and 12 can be made practically continuous. By bearing outwardly while moving the lever toward the operator, from high speed position, that is bearing it against the bar 12, the operating lever may be moved from high to neutral position by a continuous movement. Similarly, if desired, by bearing inwardly after passing neutral, the lever may be moved from low speed to high speed by a continuous movement. This invention thus provides a means whereby the operator may at will either stop the lever in intermediate position, or not, the lever being moved by a practically continuous and direct forward and backward movement.

As stated before the shoulders 32 and 33 must necessarily be very shallow for if these shoulders are too deep the movement of the lever 16 sidewise, or inwardly, will be sufficient to throw the reverse gears into operative position and thereby cause breakage unless some form of mechanism is provided whereby the engaging movement of the reverse gear is prevented. By making the shoulders shallow this invention dispenses with all such auxiliary mechanism.

Referring to Figs. 4, 5 and 6, upon the side member 11, below the recess 28, is pivotally mounted a bridging device 40, in the form of a gate. This gate is mounted upon a pivot pin 41 between bearing lugs 42, 42, located upon opposite sides of the recess. To the gate is attached a handle 43, by means of which the gate may be thrown from the full line position shown in Figs. 4 and 6 to the dotted line position shown in Fig. 6. A spring 44 has one of its ends connected to the handle 43 and the other to a lug 45 on the side member 11. This lug it will be noted is mounted near the pivot pin 41 so that the gate 40 is yieldingly locked in both the full and dotted line positions shown in Fig. 6. It will be noted that when the gate is in the full line position shown in Fig. 4 it forms a continuous bearing surface 46 with the bearing surfaces 47 on the side member 11 of the guide. Therefore when the gate is thrown to operative position it forms with the side members of the guide practically a continuous bearing surface and prevents all inadvertent movement of the hand or speed controlling lever 16 into reversing position. The gate may however be thrown quickly to inoperative position shown in dotted lines in Fig. 6 by depression of the handle 43, and the spring 44 will hold it in such position. It will be obvious that this gate 40 need not necessarily be operated by means of the handle 43 directly connected to the gate, but may be operated by means of a link connecting it with a foot lever. This gate is especially useful when used in connection with the shallow stop shoulders 32 and 33, since by bearing inwardly on the lever 16 it may be moved by continuous movement from one extreme position $b$ to the other extreme position $d$.

Although I have shown stops 32, 33 in the form of shoulders formed by cutting out the sides of the guides 12, it is to be understood that this invention is not limited to the specific construction shown and described. For instance the guides may be formed with projecting portions forming stops or shoulders which projections are beveled back from the shoulders and run into the guide, thereby providing a construction in which when the lever is moved in one direction it will be stopped by the shoulder, while when moved in the opposite direction it will move over the beveled portion. By means of this construction the same result is obtained as by the construction shown and described. Also the guide may be constructed as a guide bar having the stop shoulders on the opposite sides of the same. This is merely the reverse arrangement of the slot construction.

It is to be further understood that this invention is not to be limited to the specific construction shown or described.

What I claim is:

1. In a controlling mechanism for motor vehicles, the combination of a lever pivotally mounted for movement in two planes substantially at right angles to each other, and a guide comprising members arranged on opposite sides of said lever and providing a substantially straight slot in one of said planes, and one of said members having a recess therein communicating with said slot intermediate the ends of the latter and arranged in the other of said planes, said lever having more than two operating positions in said slot and an operating position in said recess, and each of said members having an abutment adapted to arrest said lever at one of its operating positions, one of said abutments arresting the lever when moving in one direction and the other arresting the movement in the opposite direction.

2. In a controlling mechanism for motor vehicles, the combination of a supporting frame, a pair of side members mounted on said frame, a speed controlling and reversing lever mounted for movement between said members, longitudinally to effect forward changes of speed, and transversely to effect reversing, one of said side members being provided with a deep recess into which the lever may be moved for reversing, and a shallow offset portion forming a shallow shoulder, the opposite side member being provided with a shallow offset portion forming a second shallow shoulder facing oppositely from the first shallow shoulder.

3. In controlling mechanism for motor vehicles, the combination of a guide, a hand lever mounted for movement along and transversely of said guide, and means on the guide for normally preventing transverse movement constructed to be automatically held in operative and inoperative positions.

4. In controlling mechanism for motor vehicles, the combination of a guide, a hand lever mounted for movement along and transversely of said guide, said guide being constructed to permit transverse movement at a predetermined point, means on the guide for preventing transverse movement, and means to hold said preventing means yieldingly in operative and inoperative positions.

5. A guide or sector comprising a side member provided with a recess, a gate adapted to bridge said recess and pivotally mounted rearwardly of said recess, a handle connected with the gate to move it to two positions about said pivot, and a spring connecting the handle and the sector arranged to retain the gate in both positions.

6. In a controlling mechanism for motor vehicles, the combination of a guide, a hand lever mounted for movement along and transversely of the guide, said guide being provided with a deep recess and a shallow offset portion forming a shallow stop shoulder, and a bridging gate on the guide constructed to connect opposite sides of the recess and form a continuous bearing surface with the guide.

7. In a controlling mechanism for motor vehicles, the combination of a guide, a hand lever mounted for movement along and transversely of the guide, said guide being provided with a deep recess and a shallow offset portion forming a shallow stop shoulder, a gate on the guide mounted on a pivot below the recess constructed to swing on its pivot to a position to bridge and connect opposite sides of the recess and form a continuous bearing surface with the guide.

8. In a controlling mechanism for motor vehicles, the combination of a supporting frame, a pair of side members mounted on said frame, a speed controlling and reversing lever mounted for movement between said members, longitudinally for changes in speed forward, and transversely for reversing, one of said side members being provided with a deep recess into which the lever may be moved for reversing, and a shallow offset portion forming a shallow stop shoulder, the other side member being provided with a shallow offset portion forming a second shallow stop shoulder facing oppositely from the first shoulder, and a bridging gate on the guide constructed to connect opposite sides of the recess and form a continuous bearing surface with the guide.

In testimony whereof I affix my signature in presence of two witnesses.

RUSSELL HUFF.

Witnesses:
E. N. HEARN,
C. I. DALE.